Jan. 4, 1927.

N. TRBOJEVICH

FRICTION DIFFERENTIAL GEAR

Filed June 6, 1923    2 Sheets-Sheet 1

1,612,954

Inventor
Nikola Trbojevich

By Whittemore Hulbert Whittemore
+ Belknap    Attorneys

Jan. 4, 1927. 1,612,954
N. TRBOJEVICH
FRICTION DIFFERENTIAL GEAR
Filed June 6, 1923  2 Sheets-Sheet 2

Inventor
Nikola Trbojevich

By Whittemore Hulbert Whittemore
+Belknap  Attorneys

Patented Jan. 4, 1927.

1,612,954

UNITED STATES PATENT OFFICE.

NIKOLA TRBOJEVICH, OF DETROIT, MICHIGAN.

FRICTION DIFFERENTIAL GEAR.

Application filed June 6, 1923. Serial No. 643,676.

The invention relates to a novel form of a differential or epicyclic gear, one that is particularly adapted for use in final drives of motor vehicles. The differential now generally used in passenger cars and trucks usually consists of a spider bolted to the ring gear, carrying a number of (usually four) bevel pinions, and of two opposite bevel gears keyed to right and left wheel axles, engaging said planetary pinions at opposite sides. When both wheels receive an equal traction, the differential does not operate and the planetary pinions serve merely as driving wedges or keys to propel the vehicle. However, if for some reason or other one of the wheels is compelled to accelerate relatively to the other, it is free to do so and the other wheel is automatically retarded a proportional amount.

I have discovered that it is possible to greatly simplify the design of the conventional differential without sacrificing any of its operating features and, indeed, such a simplification results in an improved efficiency all around. Thus, my new differential, besides being simpler and easier to manufacture, is also more silent, more compact, more powerful for its size, and easier to maintain in an operating condition than the conventional type.

In the drawings:—

Figure 1:
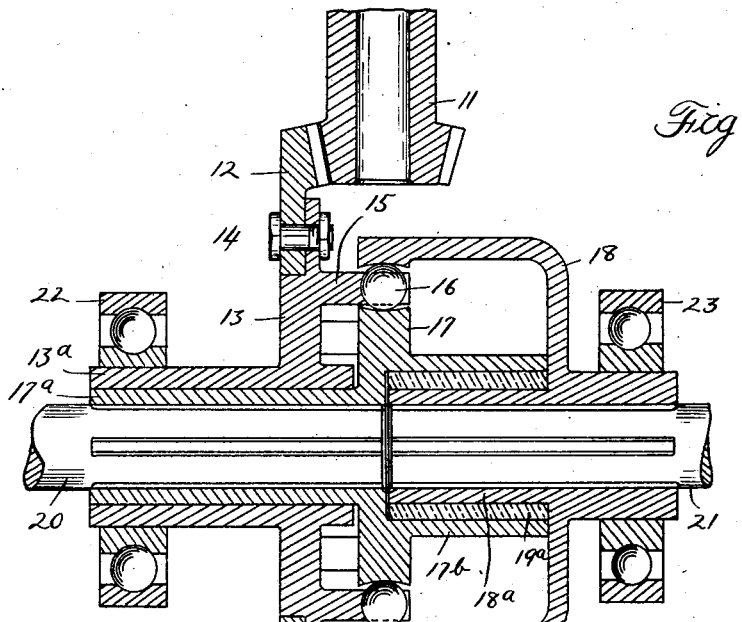
Figure 1 shows a sectional view of a typical construction embodying my invention.

Referring now to the Figure 1, the bevel pinion 11 engages the ring gear 12 which is bolted to the spider 13 by a number of suitable bolts 14. Said spider is made preferably of some antifriction metal, such as bronze, and has a number of smooth compartments 15 formed to house a number of steel balls 16. The other end of said spider 13 is formed into a bearing 13$^a$ having a running fit with the shank 17$^a$ of the inner race 17.

The outer race 18 is a bell shaped forging, hardened and accurately ground in its bearing surfaces. It co-operates with the similarly finished inner race 17 in holding and compressing the balls 16. In the central part of said outer race 18 a hub 18$^a$ is formed the object of which is to provide a suitable support for the bearing 17$^b$ of the inner race 17 and thus prevent the apparatus from buckling under the radial thrust produced by the ring gear 12. The races 17 and 18 are however, rotatable with respect to each other, and the friction created by said rotation is minimized by the employment of the bronze sleeve 19$^a$ as shown. The ends of the axles 20 and 21 are splined and fit into the corresponding carefully bored and splined hubs of the races 17 and 18. The whole apparatus is supported in the rear axle housing by means of the two ball bearings 22 and 23, as indicated.

Figure 4:
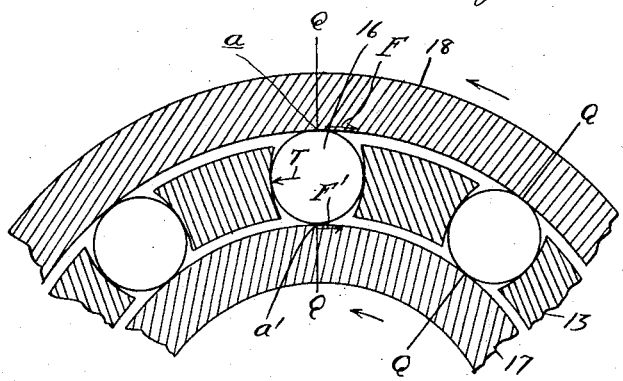
Figures 4 and 5 are diagrams explaining the mechanical principles involved.
Figure 5:
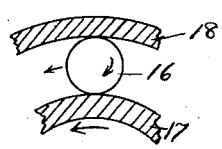

From the preceding description and the diagram Figure 4, the operation of the apparatus will be understood. The balls 16 are held and compressed by the races 17 and 18 with considerable radial forces Q (Figure 4). At the point $a$ therefore, there is a metal to metal contact, and a corresponding friction force F is generated which resists the tendency of the tangential force T to slide the ball 16 on the face of the ring 18. A similar condition obtains at the opposite point $a'$ situated on the circumference of the inner ring or race 17. It is clear from the diagram that if the sum of the two friction forces F and F' is greater than T (the tangential load carried by each ball) the balls 16 will not slip with respect to either of the races 17 and 18 when the spider 13 is rotated, but will drag said races along and cause them to rotate with the same angular velocity, and in the direction as indicated by the arrows. Thus, the vehicle will be positively driven when both wheels are geared to the road and are thus compelled to rotate in the same direction. However, if one of the wheels is held fast (18 in Figure 5) and the other (17) is permitted to rotate freely, and the spider B pushes the balls 16 ahead as indicated by the arrow, the inner ring 17 will rotate ahead (counter clockwise) with an increased velocity. A rotation of the ring 18 in the same direction will result if the ring 17 is held fast. Furthermore, if the spider 13 is held fast and one of the wheels is rotated, the other wheel will rotate in the opposite direction. It will be seen from this that so long as the friction forces F are being constantly generated, always in excess of the tangential load T, the mechanism as illustrated in Figure 1, will be fully equivalent to the conventional differential of the geared type and will uniformly and positively drive both wheels ahead when they are evenly geared to the road but will permit a free differentiation at any instant between the two wheels if either one of the wheels is compelled by an outside force to increase or decrease its normal rate of rotation. It may be stated, therefore, that the utility of this novel apparatus hinges first on whether or not it is possible to constantly generate the friction forces F of a sufficient magnitude to withstand the torque transmitted by the ring gear, without slipping and with a sufficient margin of safety, and second, whether the wear of the members will render the life of this appliance too short for practical purposes. As it is well known from mechanics the friction force, $F = f Q$, where $f$ is the coefficient of friction, and $Q$ is force of compression. According to the experiments performed by Rennie and others, the value of said coefficient of friction for slightly lubricated and smooth steel surfaces ranges from 14 to 40 percent, the higher values of $f$ corresponding to higher surface pressures. A simple calculation will show that by this new gear a considerable torque may be safely transmitted without encountering any serious practical difficulty. A steel ball of only ½ inch diameter is able to sustain a normal load of approximately 25000 lbs. before being crushed. Now if we apply only one fifth of that load to each ball, and further assume the value of $f$ to be only 15 percent, it follows that $F = 750$ lbs. As there are two forces F for each ball, and supposing that there are 15 balls employed, the total tangential force transmissible by a mechanism of this type is over 22500 lbs., which is a strength greatly in excess over that of a toothed wheel of a similar size, and is sufficient to propel an ordinary motor car. It will be apparent from this that a gear of this kind has a marked advantage over the toothed gear of the conventional form. While in an ordinary gear the tangential load is carried usually by only a few teeth at a time, in this case, all the balls carry the load all the time, thus reducing the load carried by each ball to only a small fraction of the total load. Furthermore, as each ball generates two friction forces F, the load element is still further halved for each point of contact.

A method of applying the compressing forces Q to the balls is the following: The balls 16, all of which are of exactly the same diameter, are a little larger than the space between the two rings 17 and 18 and are forced in between the two rings when the apparatus is assembled. Both the balls and the races are preferably made of alloy steel having great tensile strength and surface hardness. Owing to the oversize of the balls, they are compressed to a slightly elliptical shape, and the rings themselves are slightly deformed. However, all deformations must be kept within the elastic limits of the materials employed, as a permanent displacement would mar the surfaces and would make the proper differentiation between the races 17 and 18 impossible. If the dimensions are properly selected it is possible to keep the forces Q between two limits, that is, Q must be sufficiently great to produce the theoretically required friction forces F, and yet it must be less than a certain maximum in order not to injure the balls and the races.

The effect of the wear in this mechanism will be to reduce the diameters of the balls and increase the space between the rings. Thus, the maximum transmissible tangential force will gradually grow less and less as the gear wears out. However, owing to the fact that the balls wear only when they are rotating (as they cannot slip) and the rotation of the balls takes place only when the wheels are differentiating, that is, only occasionally and at low speed, and further that the balls and races are accurately ground and possess an extreme surface hardness; it will be seen that a mechanism of this kind will have very little wear and will function for a long time without the need of any adjustment or attention.

Figure 2:
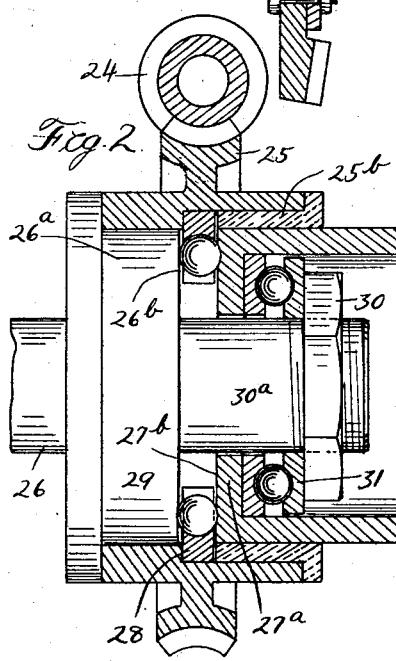
Figure 2 is a modified construction having an added feature of adjustability.
Figure 3:
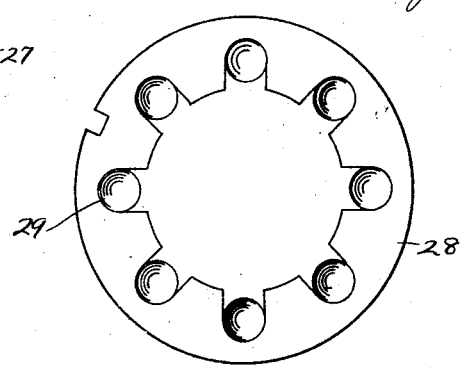
Figure 3 shows the plan view of the spider employed in the type shown in Figure 2.

Figure 2 shows a slightly modified construction of my improved differential. The worm 24 engages the worm wheel 25, the latter being rotatably mounted on the bosses $26^a$ and $27^a$ formed at ends of the two wheel axles 26 and 27. A spider 28 (shown in plan view in Figure 3) is keyed concentrically to the gear 25 and carries a number of steel balls 29. The balls are compressed with a force exceeding the load to be transmitted between the hardened and ground faces $26^b$ and $27^b$ of the bosses $26^a$ and $27^a$. The compression is obtained by tightening the nut 30 engaging the threaded shank $30^a$ of the axle 26 against the thrust bearing 31 which bearing again is mounted on and presses against the inner surface of the hollow axle boss $27^a$. The axles 26 and 27 also mutually support each other and thus prevent the apparatus from buckling under the load through the medium of the wide hub $25^a$ of the worm gear 25. A bronze bushing $25^b$ is inserted between the hub $25^a$ of the gear 25 and the outer circumference of the hollow axle boss $27^a$ to facilitate assembling and to reduce the friction which is generated when the wheels differentiate and the axles 26 and 27 rotate relatively to each other. The operation of the apparatus is fully analogous to that of the previously described modification except that the compression force Q in this case is not obtained by the initial springing of the races, but by tightening the thrust nut 30.

Figure 6:
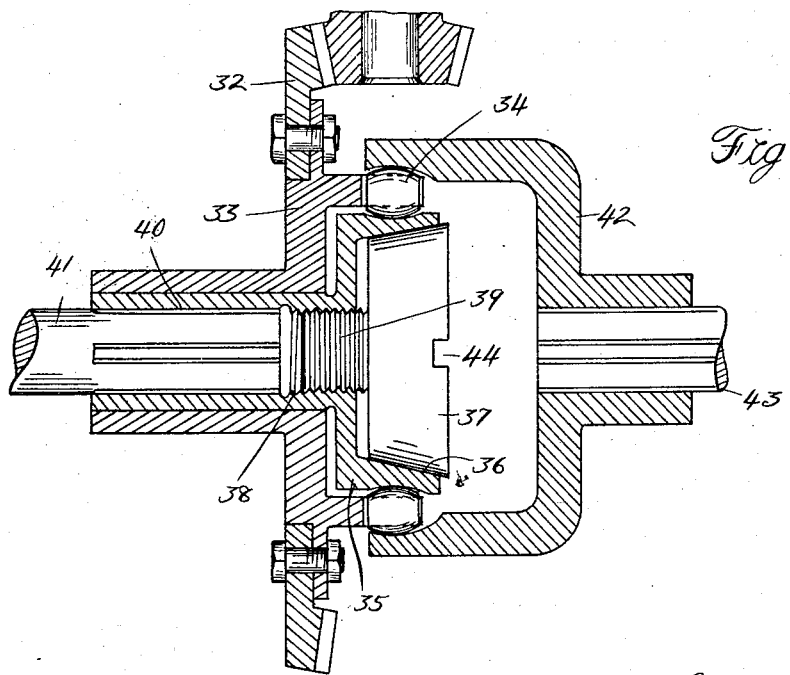
Figure 6 shows another modified construction employing barrel rollers.

Figure 6 shows still another modification of my improved differential. The ring gear 32 is bolted onto the spider 33 having a plurality of smooth compartments housing a number of barrel shaped rollers or balls 34, one ball in each compartment. The inner race 35 is formed in the shape of a bell-like sleeve having an accurately ground tapered hole 36 in the front end to fit the tapered adjusting plug 37 and a central bore 38 the front end of which is threaded to fit the threaded shank 39 of said adjusting plug, while the rear end 40 of said bore is splined and fits the splined end of the left axle 41. The outer race 42 is also a bell shaped forging of comparatively massive proportions and is concentrically bored and splined to receive the right axle 43. The adjusting plug 37, as already stated, fits the tapered hole and the threaded portion of the inner race 35 and is provided with a diametral keyway 44 in order that it may be tightened with a suitable wrench and thus cause the inner race 35 to swell or expand. Said plug is also prevented from working loose from its adjusted position in the race 35 by means of one or more suitable keys or pins (not shown).

The manufacture and assembly of a mechanism of this kind may be planned and executed in many various ways, but the object is always to subject the balls 34 to an intense radial pressure without injuring the same or the races. Thus the outer ring 42 might be heated and shrunk on the balls 34, and the taper plug 37 might be tightened at the same time to increase the radial pressure still further. The purpose of the plug 37 is not so much to provide adjustment after the apparatus has been assembled and operated as it is to facilitate the manufacture and assembling of said appliance. It will be understood that the presence of the taper plug 37 permits of wider limits of variations in the diameters of balls and races which fact will naturally tend to reduce the cost of production. A further advantage connected with the employment of said adjusting plug lies in the fact that the elastic displacement of the molecules in the inner race 35 is reduced as the plug 37 tends to expand the race 35 outwardly while the forces Q tend to compress the same inwardly. Under such conditions the resulting displacement is materially less than if the forces were acting in one direction only.

From the preceding description it will be seen that the novelty of my invention consists first of my finding a new use for a common ball bearing, and second in my discovering a new principle regarding the desirability of a friction gear in certain classes of machinery. Because, prior to my discovery it was generally believed that a friction gear is not capable of transmitting heavy loads, and that the natural field for friction gearing was in mechanisms running at a high rate of speed, and carrying but a slight load. I have partially reversed that principle by maintaining that a friction gear of the specified kind may be used for transmission of even heavier loads than those which a toothed gear of approximately the same size would stand, although a high speed and continuous running is detrimental on account of wear. It will also be readily understood that pins, rollers and tapered or barrel rollers may be employed instead of rolls in mechanisms of this kind and approximately the same results obtained. However, in my preferred construction I employ free steel balls only.

What I claim as my invention is:—

1. In a differential, the combination with a driving member and a pair of driven members, of a spider concentrically mounted on said driving member, a plurality of rolling members carried by said spider, a pair of races respectively carried by said driven members, and means for adjustably compressing said rolling members between said races with sufficient force to frictionally transmit the torque from said driving member to said driven members.

2. In a differential, the combination with a driving member and a pair of driven members, of a spider concentrically mounted on said driving member and provided with a plurality of compartments, a plurality of balls carried by said spider in said compartments, a pair of races respectively carried by said driven members, and means for adjustably compressing the balls between said races with sufficient force to frictionally transmit the torque from said driving member to said driven members.

3. In a differential the combination of a driving spider having a plurality of smoothly finished compartments, a plurality of free rolling members concentrically disposed about the axis of said spider and rotatable in said compartments, an outer hollow-shell-shaped driven member elastically compressing the rolling members on their outer sides, an inner driven member compressing said members on their inner sides, and means for expanding the inner driven member against the rolling members.

4. In a differential the combination of a driving spider having a plurality of concentric compartments, a plurality of free rolling members rotatable in said compartments, an outer elastic shell, an inner driven member concentric with said spider and shell, a tapered plug fitting into said inner member, means for forcing and holding said plug in position to radially expand the inner member.

5. In a differential the combination of a driving spider having a plurality of concentric compartments, a plurality of free rolling members rotatable in said compartments, two driven members coaxial with the spider and touching the rolling members on their opposite sides, and means for compressing and holding the driven members against the rolling members and each other to produce the required high pressure upon the rolling members and to permit of a free rotation of one driven shaft relative to the other.

In testimony whereof I affix my signature.

NIKOLA TRBOJEVICH.